March 25, 1924.  1,488,378
J. G. CARROLL
SUSPENSION MEANS FOR RAILROAD BOX CARS
Filed April 17, 1922
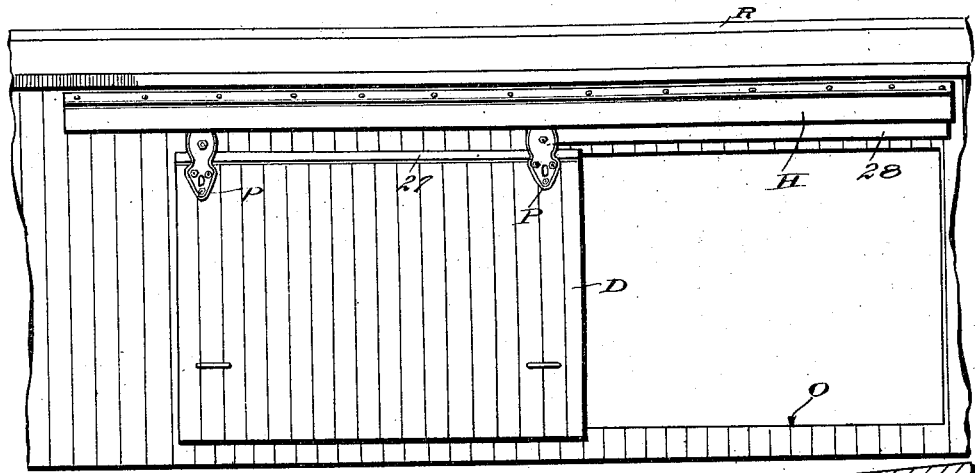
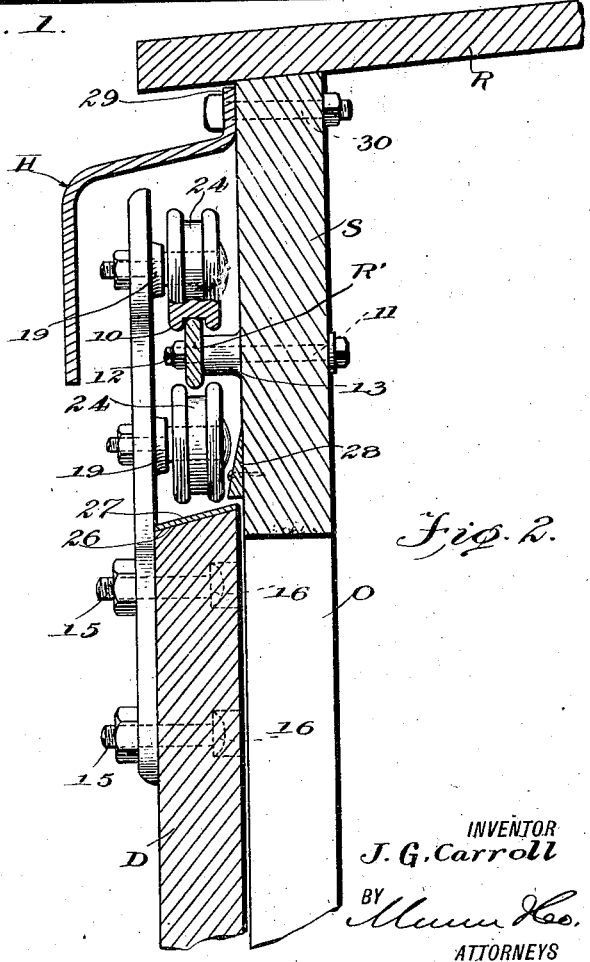
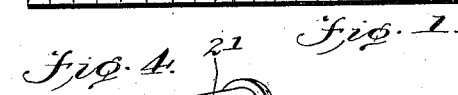
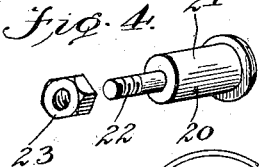
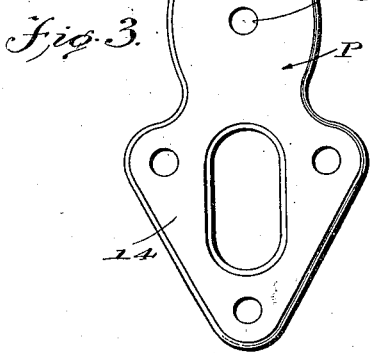
WITNESSES
INVENTOR
J. G. Carroll
BY
ATTORNEYS Patented Mar. 25, 1924.

1,488,378

UNITED STATES PATENT OFFICE.

JOHN G. CARROLL, OF RALEIGH, NORTH CAROLINA, ASSIGNOR OF ONE-THIRD TO JOHN W. THOMPSON, OF RALEIGH, NORTH CAROLINA.

SUSPENSION MEANS FOR RAILROAD BOX CARS.

Application filed April 17, 1922. Serial No. 553,329.

*To all whom it may concern:*

Be it known that I, JOHN G. CARROLL, a citizen of the United States, and a resident of Raleigh, in the county of Wake and State of North Carolina, have invented certain new and useful Improvements in Suspension Means for Railroad Box Cars, of which the following is a specification.

This invention relates to door suspension means for railroad box cars or the like.

The invention more particularly relates to suspension means for a slide door on railroad box cars, or the like, and has for its object to provide suspension means of this character which eliminates any possibility of the door becoming stuck or caught; which is adapted to permit the door to be easily opened and closed; and which is exceedingly simple in structure and reliable in operation.

It is also an important object of the invention that means be associated with the suspension means for the door whereby the suspension means for a door will be protected from the weather and also rain will be prevented from running down upon the inner side of the door and thus preserve the same.

Other objects will hereinafter appear.

The invention is illustrated by way of example in the accompanying drawings, in which:—

Figure 1 is a fragmentary view in side elevation of a box car showing the present invention applied.

Figure 2 is a fragmentary vertical transverse sectional view of the same illustrating the manner in which the door shown is suspended.

Figure 3 is a face view of one of the plate brackets used for suspending the door.

Figure 4 is a detailed view of a pulley journal bolt carried by the plate bracket shown in Figure 3.

Referring to the drawings more particularly in Figures 1 and 2, R indicates the roof of a box car, S the side wall thereof which is formed with an opening E, said opening being closed by a slide door D. For suspending the slide door D there is provided a rail R' which is an elongated member preferably rectangular in cross section and having its upper and lower edges beveled as indicated at 10. The rail is secured to the side wall S of the car by bolts 11, said bolts extending through the side wall as illustrated in Figure 2 and in each instance having a nut 12, and interposed between the rail and the side of the box car is a spacer collar or bushing 13 whereby to hold the rail R in proper spaced relation with the side of the box car.

There is also provided for each door a pair of suspension or bracket plates preferably of the form shown in Figure 3 and referred to generally by the reference character P. This bracket plate in each instance terminates at its lower end in an enlarged substantially triangular shaped portion 14 which is provided with suitable openings for the reception of the blots 15 whereby the same may be secured to the door D. Preferably the bolts are countersunk within the inner side of the door as indicated at 16, Figure 2. The remaining portion of each plate P is provided with a pair of openings, one occurring adjacent the upper end thereof as at 17 and the other occurring at a point substantially central of the length of the plate as at 18. Also the plate is formed upon its inner side with a pair of bosses 19, one for each of the openings 17 and 18, said bosses registering with the openings 17 and 18 and having openings extending therethrough. Each plate P carries a pair of journal bolts 20, said journal bolts each comprises an enlarged portion 21 and a reduced threaded portion 22 which carries a nut 23. The threaded portion 22 is adapted to be extended through either of the openings 17 or 18 of the bracket plate P, and the bolt is secured to the bracket plate by its nut 23. The enlarged portion 20 will abut the associated portion 19 and upon this enlarged portion in each instance there is journaled a grooved roller 24. The rollers 24 are adapted to receive therebetween the rail R' and thus suspend the door D for movement longitudinally of the car. It will be observed that the lowermost roller 24 does not contact with the associated edge of the rail R, the purpose of which will later be explained.

The upper edge of the door D is inclined as shown at 26, Figure 2, and this edge is covered with a strip of sheet metal 27. Immediately above the door there is secured to the side wall of the car a weather strip 28 which is substantially triangular in cross section so that its inner face is adapted to direct water draining down the side of the car to fall upon the strip of sheet metal 27 carried upon the upper edge of the door D'. The weather strip 28 may be secured to the side wall of the car in any preferred manner.

Also there is provided a protecting means for the rollers 24 and rail R' which consists in a hood generally indicated by the reference character H, said hood being substantially L-shaped in cross section and having its upper portion formed with an extension 29 by which the hood is secured to the side wall of the car by the means of bolts as at 30.

The operation of the suspension means for permitting the door D to move longitudinally of the associated car is thought to be entirely obvious. It should be pointed out however that by spacing the lowermost roller 24 slightly from the rail R that this arrangement prevents sticking of the door, that is to say, should one end of the door be lifted in an effort to move the same, the lowermost roller 24 will engage the track R' and thus serve as a means for limiting the upward movement of the door, and said means being adapted to permit easy longitudinal movement of the door in an obvious manner.

The weather strip 28 described and shown serves to prevent water from running upon the rear surface or face of the door D. This is of particular value in preserving the door. The housing H protects the rollers 24 from the weather and thus the door is at all times easily moved for opening and closing the same.

Attention is especially directed to the fact that the space between the bushings 13 is entirely open so that snow and rain may pass freely through the space between the track and the wall S. This prevents rain and snow from accumulating behind the track and interfering with opening or closing the door. However the weather strip 28 effectively prevents the water and the like passing between the track and the side wall S from entering the car by way of the opening O.

I claim:—

1. The combination with a side wall having an opening, of a sliding door for closing said opening and having its upper portion overlapping the side wall above said opening and being inclined downwardly and outwardly, a metal cover strip secured to the downwardly and outwardly inclined upper end of said door, a weather strip applied to said wall slightly above said door and overlapping the door, the outer surface of said weather strip being inclined outwardly and downwardly for directing any water striking the same onto said metal cover strip at a point spaced from the inner edge of the same, a track applied to said wall, hangers carried by said door and mounted on said track, and a hood overhanging said track, said hangers and said weather strip.

2. The combination with a side wall having an opening, of a sliding door for closing said opening, a track extending across said wall above said opening, a plurality of spaced bolts connecting said track to said wall, short bushings mounted on said bolts and confined between said wall and said track and constituting the sole means for spacing said track from the wall, the space between said bushings being entirely open for the passage of water, hangers carried by said door and mounted on said track, and a weather strip secured to said side wall below said track and said bushings and overlapping the upper end of said door for directing water passing between said bushings outwardly away from said opening and over the upper end of said door.

3. The construction set forth in claim 2, and a hood applied to said side wall and overhanging said hangers and said track.

JOHN G. CARROLL.